(12) United States Patent
Stephens et al.

(10) Patent No.: US 11,954,023 B2
(45) Date of Patent: Apr. 9, 2024

(54) GARBAGE COLLECTION PREFETCHING STATE MACHINE

(71) Applicant: Microsoft Technology Licensing, LLC, Redmond, WA (US)

(72) Inventors: Maoni Zhang Stephens, Kirkland, WA (US); Peter Franz Valentin Sollich, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 17/868,933

(22) Filed: Jul. 20, 2022

(65) Prior Publication Data

US 2024/0028509 A1 Jan. 25, 2024

(51) Int. Cl.
G06F 12/00 (2006.01)
G06F 12/02 (2006.01)
G06F 12/0862 (2016.01)

(52) U.S. Cl.
CPC ...... *G06F 12/0253* (2013.01); *G06F 12/0862* (2013.01)

(58) Field of Classification Search
CPC .......................... G06F 12/0253; G06F 12/0862
See application file for complete search history.

(56) References Cited

U.S. PATENT DOCUMENTS

| | | | |
|---|---|---|---|
| 6,463,503 B1 | 10/2002 | Jones et al. | |
| 6,662,274 B2 | 12/2003 | Subramoney et al. | |
| 8,024,379 B2 | 9/2011 | Siegwart et al. | |
| 8,732,312 B2 * | 5/2014 | Minato | G06F 9/5083 709/226 |
| 2002/0016953 A1 | 2/2002 | Sollich | |
| 2004/0250041 A1 | 12/2004 | Sollich | |
| 2005/0044057 A1 | 2/2005 | Bluvshteyn et al. | |
| 2005/0138329 A1 | 6/2005 | Subramoney et al. | |
| 2005/0160421 A1 | 7/2005 | Bluvshteyn et al. | |
| 2005/0172301 A1 | 8/2005 | Sollich | |
| 2006/0026568 A1 | 2/2006 | Wiltamuth et al. | |

(Continued)

OTHER PUBLICATIONS

Adl-Tabatabai, et al., "Prefetch Injection Based on Hardware Monitoring And Object Metadata", In Proceedings of The ACM SIGPLAN Conference on Programming Language Design and Implementation, Jun. 9, 2004, pp. 267-276.
Cher, et al., "Cell GC: Using the Cell Synergistic Processor as a Garbage Collection Coprocessor", In Proceedings of The Fourth ACM SIGPLAN/SIGOPS International Conference on Virtual Execution Environments, Mar. 5, 2008, pp. 141-150.

(Continued)

*Primary Examiner* — Shawn X Gu
(74) *Attorney, Agent, or Firm* — Ogilvie Law Firm

(57) ABSTRACT

Garbage collection or other computational work accesses memory which is located outside processor registers. Some embodiments specify at least some of the memory accesses and separate them from other computations, and utilize a memory access state machine to control the execution of both kinds of computation. Code that employs memory access results is placed in a run routine which is divided between respective states of the state machine. The specified memory accesses are invoked from a state code, and overlap other computation. A prefetch buffer may be dynamically sized based on the availability of space in the prefetch buffer. Code for shared work, such as address relocation code, may be placed in its own state structure. Candidate code for possible separation into a specified memory access routine may be automatically recognized.

20 Claims, 3 Drawing Sheets

ENHANCED SYSTEM 102, 202 WITH SMA STATE MACHINE FUNCTIONALITY 206

MEMORY/MEDIA 112, 114

STATE MACHINE SOFTWARE 302 TO EXECUTE RUN ROUTINE 304 WHICH IS DIVIDED AMONG STATES 306, PERFORMS NON-SMA WORK 216, AND INVOKES SMA WORK 212

PREFETCH BUFFER 308 | SMA CODE CANDIDATE 310 | SHARED WORK 312 CODE 314 | ADDRESS 316 RELOCATION 318

PROCESSOR 110 | SMA ROUTINE 320 INVOCATION 322 | INTERFACE(S) 324

(56) References Cited

U.S. PATENT DOCUMENTS

| | | |
|---|---|---|
| 2007/0011658 A1 | 1/2007 | Stephens |
| 2007/0022268 A1 | 1/2007 | Stephens et al. |
| 2007/0094651 A1 | 4/2007 | Stephens et al. |
| 2007/0094671 A1 | 4/2007 | Stephens et al. |
| 2008/0172431 A1 | 7/2008 | Stephens et al. |
| 2008/0320456 A1 | 12/2008 | Biswas et al. |
| 2009/0254596 A1 | 10/2009 | Dussud et al. |
| 2009/0259702 A1 | 10/2009 | Stephens et al. |
| 2009/0265402 A1 | 10/2009 | Dussud et al. |
| 2009/0300085 A1 | 12/2009 | Stephens et al. |
| 2010/0058283 A1 | 3/2010 | Dussud et al. |
| 2010/0058304 A1 | 3/2010 | Mosier et al. |
| 2010/0223429 A1* | 9/2010 | Cher .................. G06F 12/0253 711/E12.001 |
| 2010/0318584 A1 | 12/2010 | Krishnaprasad et al. |
| 2011/0258615 A1 | 10/2011 | Sollich |
| 2011/0258616 A1 | 10/2011 | Sollich |
| 2012/0185651 A1 | 7/2012 | Kimori |
| 2012/0226872 A1* | 9/2012 | Rajic ..................... G06F 16/172 711/137 |
| 2012/0278813 A1 | 11/2012 | Stephens et al. |
| 2013/0091186 A1 | 4/2013 | Stephens et al. |
| 2014/0046984 A1 | 2/2014 | Sollich |
| 2016/0239413 A1 | 8/2016 | Stephens et al. |
| 2016/0306739 A1 | 10/2016 | Stephens et al. |
| 2016/0342400 A1 | 11/2016 | Sollich |
| 2017/0329704 A1 | 11/2017 | Wrighton et al. |
| 2018/0217779 A1 | 8/2018 | Stephens et al. |
| 2018/0217927 A1 | 8/2018 | Stephens et al. |
| 2018/0365033 A1 | 12/2018 | Yu et al. |
| 2019/0384703 A1 | 12/2019 | Stephens et al. |
| 2019/0384705 A1 | 12/2019 | Stephens et al. |
| 2020/0250084 A1 | 8/2020 | Stephens et al. |
| 2020/0401517 A1 | 12/2020 | Sollich et al. |
| 2020/0409839 A1 | 12/2020 | Stephens et al. |
| 2021/0191859 A1 | 6/2021 | Stephens et al. |
| 2021/0208954 A1 | 7/2021 | Stephens et al. |

OTHER PUBLICATIONS

Kamruzzaman, et al., "Inter-core Prefetching for Multicore Processors Using Migrating Helper Threads", In Proceedings of The Sixteenth International Conference on Architectural Support for Programming Languages and Operating Systems, Mar. 5, 2011, pp. 393-404.

"International Search Report and Written Opinion Issued in PCT Application No. PCT/US23/025094", dated Sep. 21, 2023, 14 Pages.

Andrés Amaya García, "Integrated Hardware Garbage Collection for Real-Time Embedded Systems", retrieved from <<https://sourcecodeartisan.com/download/phd_thesis.pdf>>, Aug. 2021, 244 pages.

Joseph Thomas Fieler, "A real-time garbage collection design for embedded systems", retrieved from <<https://ecommons.udayton.edu/cgi/viewcontent.cgi?article=3643&context=graduate_theses>>, 2004, 98 pages.

Harel Paz, et al., "Using Prefetching to Improve Reference-Counting Garbage Collectors", retrieved from <<http://www.cs.technion.ac.il/~erez/Papers/rc-prefetch-cc07.pdf>>, no later than Jun. 24, 2022, 15 pages.

Robin Garner, "The Design and Construction of High Performance Garbage Collectors", retrieved from <<https://users.cecs.anu.edu.au/~steveb/pubs/theses/garner-2012.pdf>>, May 2012, 102 pages.

"Garbage Collection", retrieved from <<https://ocaml.org/docs/garbage-collection>>, no later than Jun. 29, 2022, 7 pages.

"Speed up the OCaml GC by prefetching during marking (GitHub PR)", retrieved from <<https://www.reddit.com/r/ProgrammingLanguages/comments/orjeto/speed_up_the_ocaml_gc_by_prefetching_during/>>, Jul. 26, 2021, 12 pages.

"Cache prefetching", retrieved from <<https://en.wikipedia.org/wiki/Cache_prefetching>>, Mar. 16, 2022, 6 pages.

"Finite-state machine", retrieved from <<https://en.wikipedia.org/wiki/Finite-state_machine>>, Jun. 21, 2022, 14 pages.

"Coroutine", retrieved from <<https://en.wikipedia.org/wiki/Coroutine>>, Jun. 24, 2022, 15 pages.

* cited by examiner

GARBAGE COLLECTION PREFETCHING STATE MACHINE

BACKGROUND

In computer programming, garbage collection (GC) helps provide automatic memory management. The "garbage" in question is memory space which has been allocated to a program for use, is no longer needed by that program, but is not yet available for use by other programs. The garbage collector tries to identify such areas of memory so they can be reclaimed for subsequent re-allocation.

Garbage collection can free programmers from the need to manually release data objects that are no longer needed, thus making programming easier. Garbage collection can also help prevent some runtime errors, thereby enhancing cybersecurity by improving the integrity and availability of data. Many programming languages either require garbage collection, or else allow garbage collection as an option. Some software development environments allow both garbage collection and manual memory management in a given program.

Efficient implementation of garbage collection can be a high priority because garbage collectors may run frequently or at unpredictable times, or both, and may significantly slow down user program execution. Indeed, most if not all garbage collectors sometimes utilize a "stop the world" approach which prevents user programs from running at the same time as the garbage collector. However, naively reducing the amount of time spent on garbage collection may also reduce the amount of memory reclaimed, and thus hamper user program performance in other ways, e.g., by increasing the time spent swapping data between volatile and non-volatile memory devices.

SUMMARY

Some embodiments described herein address technical challenges related to garbage collection or other computational activities, such as how to manage computational costs that are imposed by relatively expensive memory access operations. In particular, some embodiments separate some or all of these slower memory access operations from faster computations that can proceed concurrently with the memory access operations. Even more particularly, some embodiments perform prefetch operations concurrently with computations that do not rely on the result of the prefetch operations, at least not in a current iteration or pass that includes the non-reliant computations.

In some embodiments, computational work that performs one or more specified memory accesses ("SMA work"), such as relatively slow memory access operations, is separated from computational work that does not perform any of the specified memory accesses ("NSMA work"). A run routine includes hardware processor instructions which upon execution by a hardware processor perform NSMA work. The run routine also includes an invocation of the SMA work. A computational state machine includes a state variable and at least two state data structures, with each state structure representing a respective state of the state machine and including a respective state code. Each state code includes a portion of the run routine processor instructions. The run routine is configured to cause execution of a selected state code based on the state variable, to cease execution when the state variable indicates a termination state of the state machine, and to switch execution to a different state code when the state variable indicates a change of state of the state machine.

Some embodiments utilize a state machine to separate computational work that performs one or more specified memory accesses ("SMA work") from computational work that does not perform any of the specified memory accesses ("NSMA work"). Embodiment operations include invoking a performance of the SMA work during an execution of the state machine; selecting a state code A based on a state variable of the state machine; executing at least a portion of the state code A, including performing a state code A portion of the NSMA work which has a lower computational cost due to the prior performance of the SMA work; switching execution of the state machine to a state code B in response to the state variable indicating a change of state of the state machine; executing at least a portion of the state code B, including performing a state code B portion of the NSMA work; and ceasing execution of the state machine in response to the state variable indicating a termination state of the state machine.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
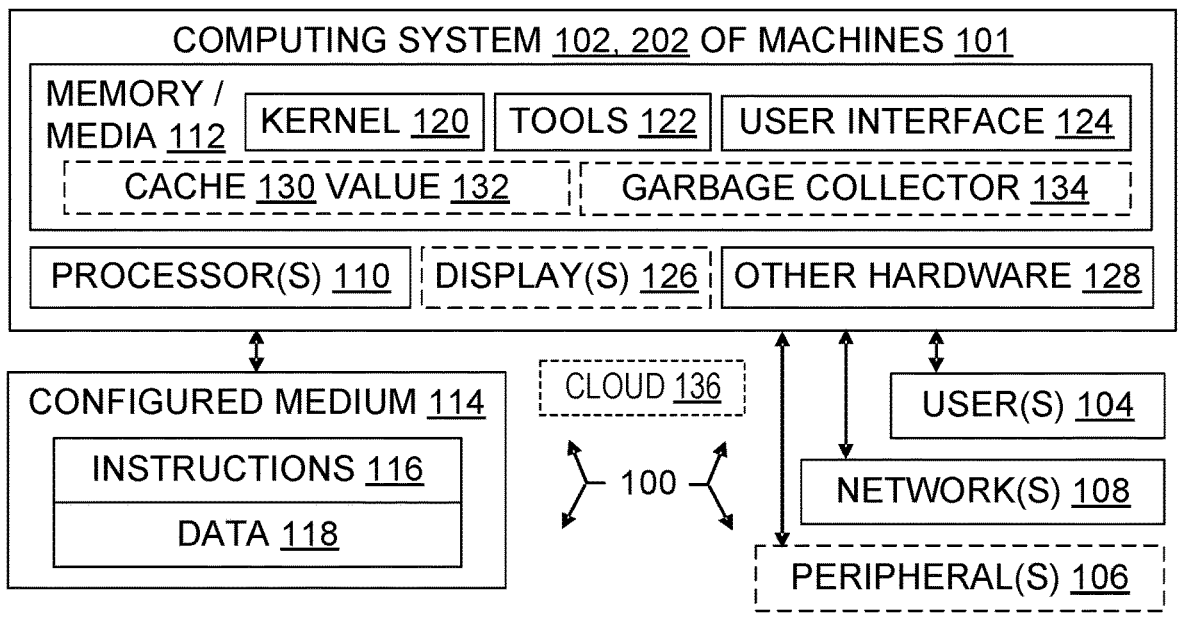
FIG. 1 is a diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts by Microsoft innovators to further optimize garbage collection technology that was already quite optimized.

Address prefetch received attention as a possible way to further reduce the time spent on garbage collection without also reducing the amount of memory reclaimed. Some garbage collection operations are performed on memory addresses. Although some of those addresses can be retrieved quickly because that are already in a processor cache, other address values are stored at locations such as main memory DRAM that take longer to access. Prefetching address values from main DRAM into a processor cache concurrently with other garbage collection work could therefore possibly reduce the time spent on garbage collection without also reducing the amount of memory reclaimed.

However, the possibility of prefetching address values raises some technical questions. One question is what paths are available to get a value from DRAM into a register. Another question is how long different paths take to execute. Additional questions are whether prefetching can reduce execution time, and if so, under what circumstances.

For the most part, a system cannot fetch a value directly from DRAM into a register when there is a processor cache present. A nontemporal fetch may be possible, but would likewise fetch into some buffer. An opportunity to reduce execution time involves not waiting for the value when the memory value is being fetched from DRAM. Without prefetch, an instruction that reads a value from memory and does something with it will delay execution until that memory value is retrieved from DRAM. Some embodiments described herein go do other computational work while that retrieval process is occurring. This reduces overall execution time, making it beneficial to separate the work into SMA and NSMA parts that can run in isolation from one another. This approach raises additional technical questions, such as how to accomplish such an overlap between prefetching and other work, and how to determine which values to prefetch.

These and other technical questions are addressed, e.g., by recognizing SMA candidate code, and by executing NSMA code and SMA routine invocations in a state machine. Overlap between expensive memory access operations and other computational work is obtained by separating the expensive memory access operations into a specific memory access (SMA) routine which is invoked by the other computation at execution points where the other computation can proceed without waiting for the result of the SMA routine, and by executing the other computation within a finite state machine. After the SMA routine is invoked, the state machine can transition to a different state in which work is done that does not depend on the result of the SMA routine; such work is said to be "isolated" from the SMA work.

When the SMA routine performs memory accesses that are relatively expensive and also isolated, this overlap beneficially reduces the time spent on garbage collection without also reducing the amount of memory reclaimed.

Relative expense is a flexible criterion for selecting memory accesses for inclusion in an SMA routine. In a given embodiment, a computational expense threshold may be set at a certain amount of time, e.g., any memory access expected to take longer than two hundred nanoseconds is considered sufficiently expensive for separation into an SMA routine. Alternately, or in addition, a location threshold may be set, e.g., any memory access from beyond the processor's L1 cache is considered sufficiently expensive for separation into an SMA routine.

Isolation is also a flexible criterion for selecting memory accesses for inclusion in an SMA routine. In a given embodiment, a given piece W of computational work may be considered isolated from the SMA routine if W can proceed without any use of any result of the SMA routine. A weaker isolation permitted in some embodiments is that a first portion of the computation W can proceed without any use of any result of the SMA routine and the fastest execution of the first portion takes longer than the slowest (or alternately, the average) execution of the SMA routine. The portion of the computation W after the first portion may then still rely on an SMA routine result.

Although garbage collection was a motivating example, the tools and techniques described herein are not entirely limited to use in garbage collection. Embodiments may also or alternatively support tree balancing, data filtering, data sorting, data transforming, graph traversing, data buffering for archival or network transmission, and other computational activities that can be separated into SMA work and NSMA work and be organized as taught herein using a state machine, a run routine whose code is divided among at least two of the state machine's states, and an SMA routine.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. Applications 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, specified memory access state machine functionality 206 could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
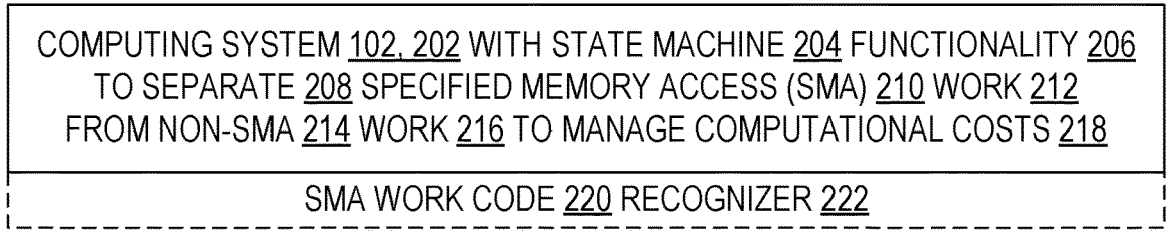
FIG. 2 is a diagram illustrating aspects of a computing system which has one or more of the state machine-based memory access cost management enhancements taught herein.

FIG. 2 illustrates a computing system 102 configured by one or more of the specified memory access state machine enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
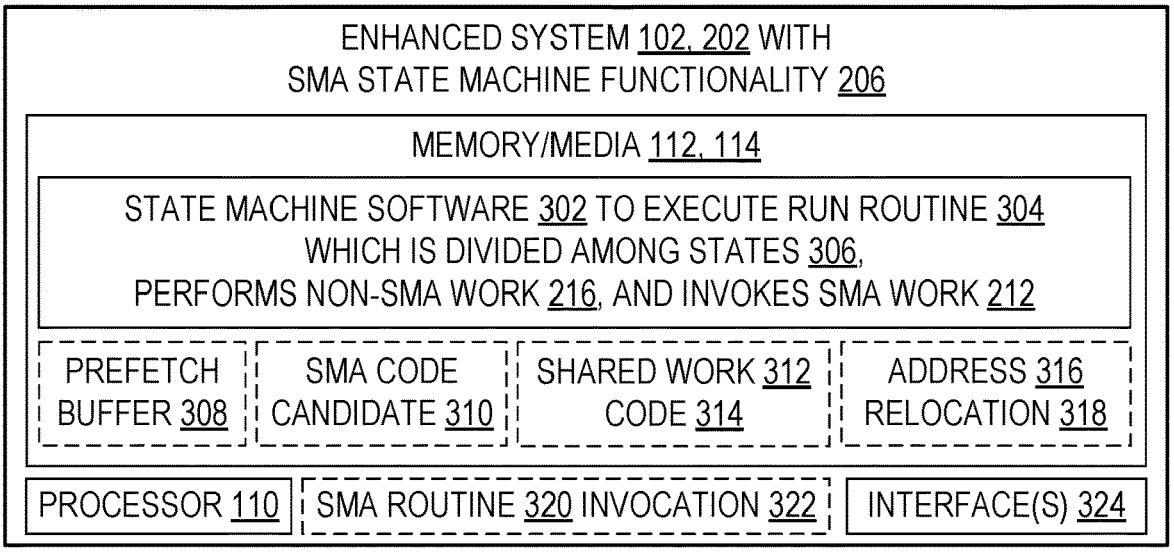
FIG. 3 is a block diagram illustrating an example enhanced system configured with state machine-based memory access cost management functionality.

FIG. 3 illustrates an example enhanced system 202 which is configured with state machine software 302 to provide functionality 206. Software 302 and other FIG. 3 items are discussed at various points herein, and additional details regarding them are provided in the discussion of a List of Reference Numerals later in this disclosure document.

Figure 4:
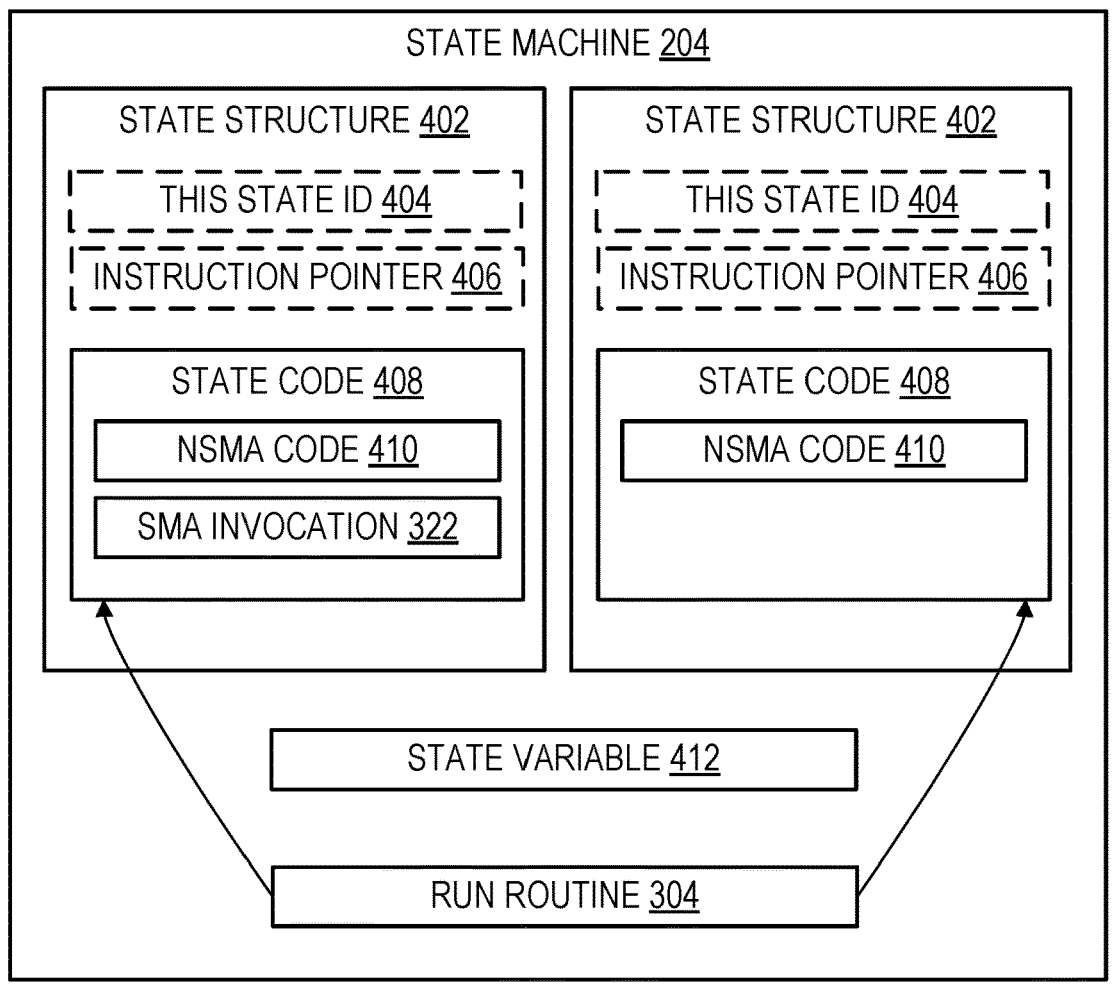
FIG. 4 is a block diagram illustrating aspects of an example state machine configured for memory access cost management.

FIG. 4 illustrates an example state machine 204. For clarity of illustration, a state machine with two state structures 402 is shown, but teachings herein can be beneficially implemented with two or more state structures 402 in a given state machine 204. Similarly, only one SMA invocation 322 is shown in this Figure, but a given embodiment may include one or more SMA invocations 322. FIG. 4 items are discussed at various points herein, and additional details regarding them are provided in the discussion of a List of Reference Numerals later in this disclosure document.

Figure 5:
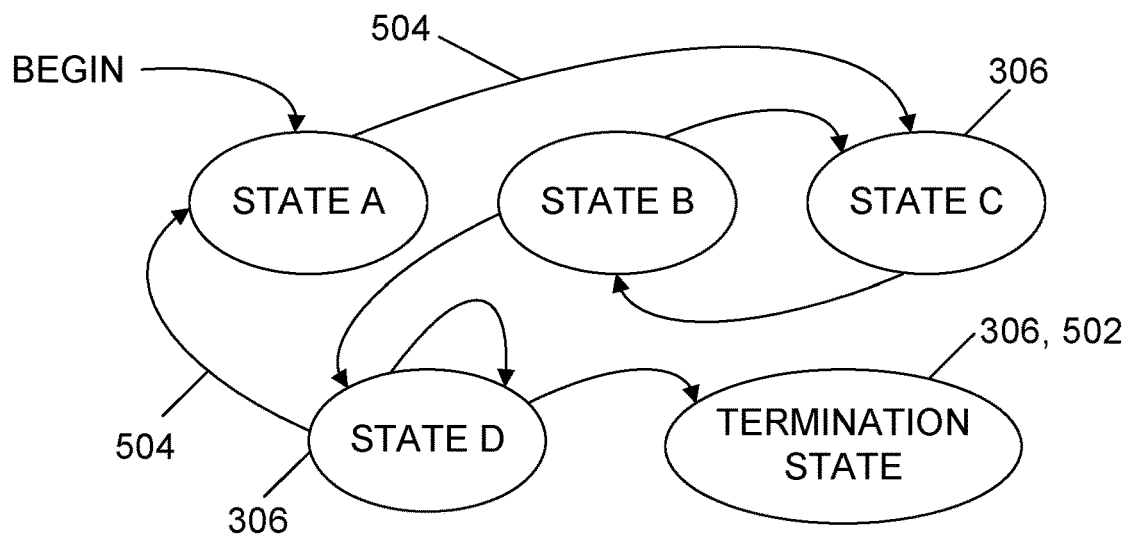
FIG. 5 is an example state transition diagram.

FIG. 5 shows an example state transition diagram for a state machine 204 which has five states 306. Ovals represent the states 306, and directional arcs represent state transitions 504. An arc at the top left from BEGIN into state A represents an entry point into execution of the state machine, e.g., when the state machine is launched by a kernel or an application. Execution of the state machine ends when the state machine transitions into a termination state 502. FIG. 5 items are also discussed at various other points herein.

Figure 6:
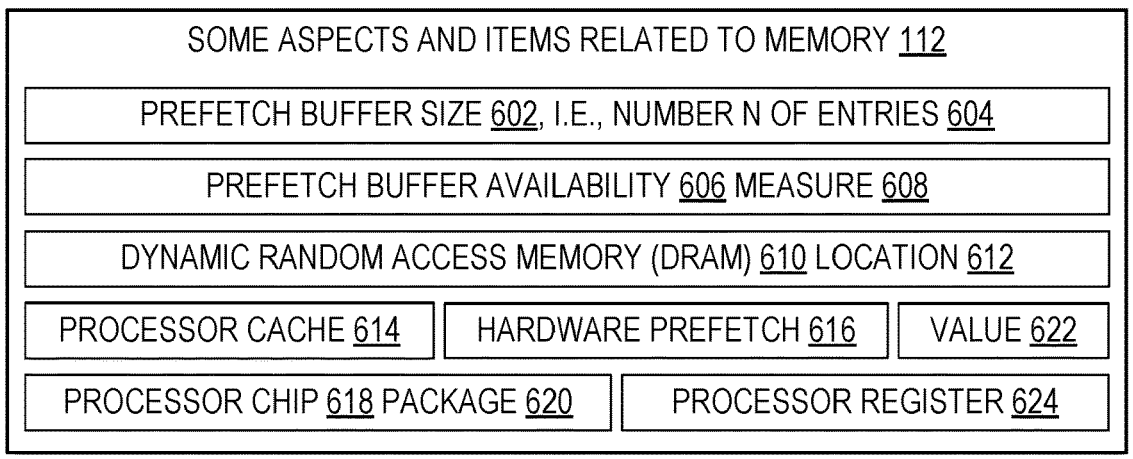
FIG. 6 is a block diagram illustrating some items related to memory and some aspects of memory or memory-related items.

FIG. 6 illustrates some aspects of memory 112 and some computing system items related to memory 112. FIG. 6 items are discussed at various points herein, and additional details regarding them are provided in the discussion of a List of Reference Numerals later in this disclosure document.

FIGS. 1 through 6 are not themselves a complete summary of all approaches to management of memory accesses using a state machine. Nor are they a complete summary of all aspects of an environment 100 or system 202 or other computational context of specified memory accesses 210 or state machines 204 or combinations thereof. FIGS. 1 through 6 are also not themselves a complete summary of all specified memory accesses 210, non-specified memory accesses 214, state machine run routines 304, or other functionalities 206 for potential use in a system 202.

In some embodiments, the enhanced system 202 may be networked through an interface 324. An interface 324 may include hardware such as network interface cards, software such as network stacks, APIs, or sockets, combination items such as network connections, or a combination thereof.

In some embodiments, an enhanced system 202 includes a computing system 202 which is configured to manage specified memory accesses. The computing system 202 is configured to separate computational work 212 that performs one or more specified memory accesses 210 ("SMA work" 212) from computational work 216 that does not perform any of the specified memory accesses ("NSMA work" 216).

The enhanced system 202 includes a digital memory 112 and a processor 110 in operable communication with the memory. In a given embodiment, the digital memory 112 may be volatile or nonvolatile or a mix.

The enhanced system 202 also includes at least one processor 110 in operable communication with the digital memory 112. The computing system 202 is configured by a run routine 304 including processor instructions 116 which upon execution by the processor 110 perform NSMA work 216, the run routine also including an invocation 322 of the SMA work, e.g., an invocation 322 of a SMA routine 320.

The computing system 202 is also configured by a state machine 204 which includes a state variable 412 and at least two state structures 402, each state structure representing a respective state 306 of the state machine and including a respective state code 408, each state code including a portion of the run routine 304.

The run routine 304 is configured to cause execution of a selected state code 408 based on the state variable 412, is also configured to cease execution when the state variable indicates a termination state 502 of the state machine, and is also configured to switch execution to a different state code 408 when the state variable indicates a change of state 306 of the state machine.

In some embodiments, the NSMA work includes memory accesses, while in other embodiments all memory accesses are separated into SMA work code. NSMA memory accesses will presumably be less costly 218 than SMA memory accesses, or fewer in number, or difficult to isolate, for example.

In some embodiments, the invocation 322 of the SMA work invokes a specified memory access routine 320 which is configured to upon execution prefetch 716 a value 622 into a prefetch buffer 308 or another cache 614.

In some embodiments, the run routine 304 is configured to upon execution perform 718 an address relocation 318 during a garbage collection 732. Relocation is merely one example of how prefetch may be used; relocation may also be accomplished without any prefetch. Address relocation 318 may be identified, e.g., as computational work which executes an address relocation routine along the following lines:

```
relocate_address(location)
{
    old_addr = *location;
    new_addr = find_new_address(old_addr);
    *location = new_addr;
}
```

In some embodiments, the state machine 204 includes at least three state structures 402 respectively representing states designated here as state A, state B, and state C, and state C has shared work code 314. These labels are merely for convenience. The code 314 performs work 312 that is shared by at least two states, in that state A code is configured to change the state machine to state C and state B code is also configured to change the state machine to state C. One such state machine is illustrated in FIG. 5; many others with one or more shared work states are also possible consistent with the teachings herein.

In some embodiments, the shared work (a.k.a. "common work") includes in-processor compute work and memory access. The other non-shared work could be compute work with memory accesses in additional state(s), or it could be only compute work.

Address relocation 318 during garbage collection 732 is an example of a good candidate for separation into a separate shared work state. Address relocation may be performed when moving objects during a garbage collection compaction phase, and may also be performed to update pointers located inside such objects. Moving objects during compaction may also involve work that is not part of updating pointers inside objects, and vice versa. Accordingly, one garbage collection state machine architecture places address relocation code 314, 408 in a shared work state Z, places other object movement code 408 in a state X, and places other internal pointer update code 408 in a state Y, and provides state transitions 504 between X and Z and state transitions 504 between Y and Z.

In some embodiments, the computing system 202 includes a SMA work code recognizer 222 which is configured to upon execution recognize 722 at least one of the following SMA work code candidates 310: a processor instruction 116 that upon execution will access memory 112 located outside a cache 614; a processor instruction 116 that upon execution may access memory 112 located outside a cache 614, depending on a status of the cache during execution of a program; or a processor instruction 116 having a computational cost 218 that is not decreased by hardware prefetch 616.

In some embodiments, the computing system 202 includes a prefetch buffer 308. In some, a prefetch buffer 308 is used only for prefetched values. But in other embodiments, the prefetch buffer 308 also stores other info for the state machine.

Some embodiments keep multiple prefetch buffer entries 604 active at a time, thereby allowing work on multiple work items. The prefetch buffer occupies memory space, so sizing it may be worth some effort. If the prefetch buffer 308 is too big, software using the buffer 308 will incur too many cache misses going through this buffer, but if the prefetch buffer 308 is too small then the software will not find an available entry to push the next work item into.

In some embodiments, the computing system 202 includes a prefetch buffer 308, the SMA work includes prefetching 716 values 622 into the prefetch buffer, and the prefetch buffer has a size 602 which the computing system is configured to adjust 724 based on a measure 608 of prefetch buffer entry availability 606.

For example, an embodiment may be configured to increase the prefetch buffer size 602 after two consecutive failed attempts to find an available prefetch buffer entry 604, or when a running tally of the most recent ten attempts to find an available prefetch buffer entry 604 has failed at least 30% of the time, or when either condition is met. Similarly, an embodiment may be configured to decrease the prefetch buffer size 602 after eight consecutive successful attempts to find an available prefetch buffer entry 604, or when a running tally of the most recent ten attempts to find an available prefetch buffer entry 604 has succeeded at least 90% of the time, or when either condition is met. The number of entries 604 added or removed by an adjustment 724, the measure 608 computation formula(s) used, and the measure 608 threshold(s) used, may vary from the specific examples provided here, and may be implemented as built-in defaults, or be set by an admin, or be determined by artificial intelligence such as a machine learning model or an expert system.

One of skill informed by the teachings of the present disclosure will acknowledge that embodiments may be selected and configured to provide various technical benefits.

For example, by separating computational work that performs one or more specified memory accesses ("SMA work") from computational work that does not perform any of the specified memory accesses ("NSMA work"), and by executing a state machine run routine that performs NSMA work, the run routine also including an invocation of the SMA work, the enhanced computing system overlaps the specified memory accesses with the NSMA work, thereby reducing the overall wall clock time spent accomplishing the combined work.

By invoking a specified memory access routine to prefetch a value into a cache, the enhanced computing system makes prefetched values available for use in future computations instead of making execution wait for those values as it would have without the prefetch. This speeds overall program execution.

By configuring the run routine to perform an address relocation during a garbage collection, the enhanced computing system makes address values available for use in garbage collection computations, e.g., object compaction and pointer updates. This allows garbage collection to benefit from advantageous characteristics such as address value prefetch and reduced code duplication.

By placing shared work code in its own state, such as state C or state Z in the examples above, the enhanced computing system reduces code duplication. This reduces developer burdens during code updates and maintenance, and also reduces the risks of errors or inconsistencies in code.

By providing a SMA work code recognizer which is configured to recognize at least one SMA work code candidate, the enhanced computing system reduces developer burdens and increases the speed benefit provided by overlapping memory access work with NSMA work.

By adjusting the prefetch buffer size based on a measure of prefetch buffer entry availability, the computing system automatically balances a risk of leaving valuable prefetch buffer space underutilized against a risk of lowering the beneficial overlap of prefetch with NSMA work.

Some embodiments involve garbage collection. Garbage collectors attempt to minimize the amount of time spent collecting memory to free. In some embodiments, memory chunks are prefetched and the garbage collector examines the memory chunks once they have been prefetched. While the garbage collector is waiting for objects to be prefetched, the garbage collector operates on other memory chunks that have already been prefetched. The activities of the garbage collector are controlled by a state machine, which greatly simplifies determining when and what the garbage collector should do to maximize throughput of examined memory and minimize latency. The garbage collector can re-use a shared state of the state machine for some common work. Using a state machine to coordinate the prefetching and other activities of the garbage collector can provide significant performance increases. Garbage collectors are found in almost all modern runtimes and an improvement in the garbage collector affects the performance of the entire machine under most if not all workloads.

These example scenarios are illustrative, not comprehensive. One of skill informed by the teachings herein will recognize that many other scenarios and many other variations are also taught. In particular, different embodiments or configurations may vary as to the number or precise workings of states 306 in the state machine software 302, for example, and yet still be within the scope of the teachings presented in this disclosure.

Other system embodiments are also described herein, either directly or derivable as system versions of described processes or configured media, duly informed by the extensive discussion herein of computing hardware.

Although specific memory access management architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. For example, a given embodiment may include additional or different data structure implementations of states 306 as well as different technical features, memory aspects, security controls, mechanisms, decision criteria, expressions, hierarchies, operational sequences, environment or system characteristics, or other code improvement functionality teachings noted herein, and may otherwise depart from the particular illustrative examples provided.

Processes (a.k.a. Methods)

Figure 7:
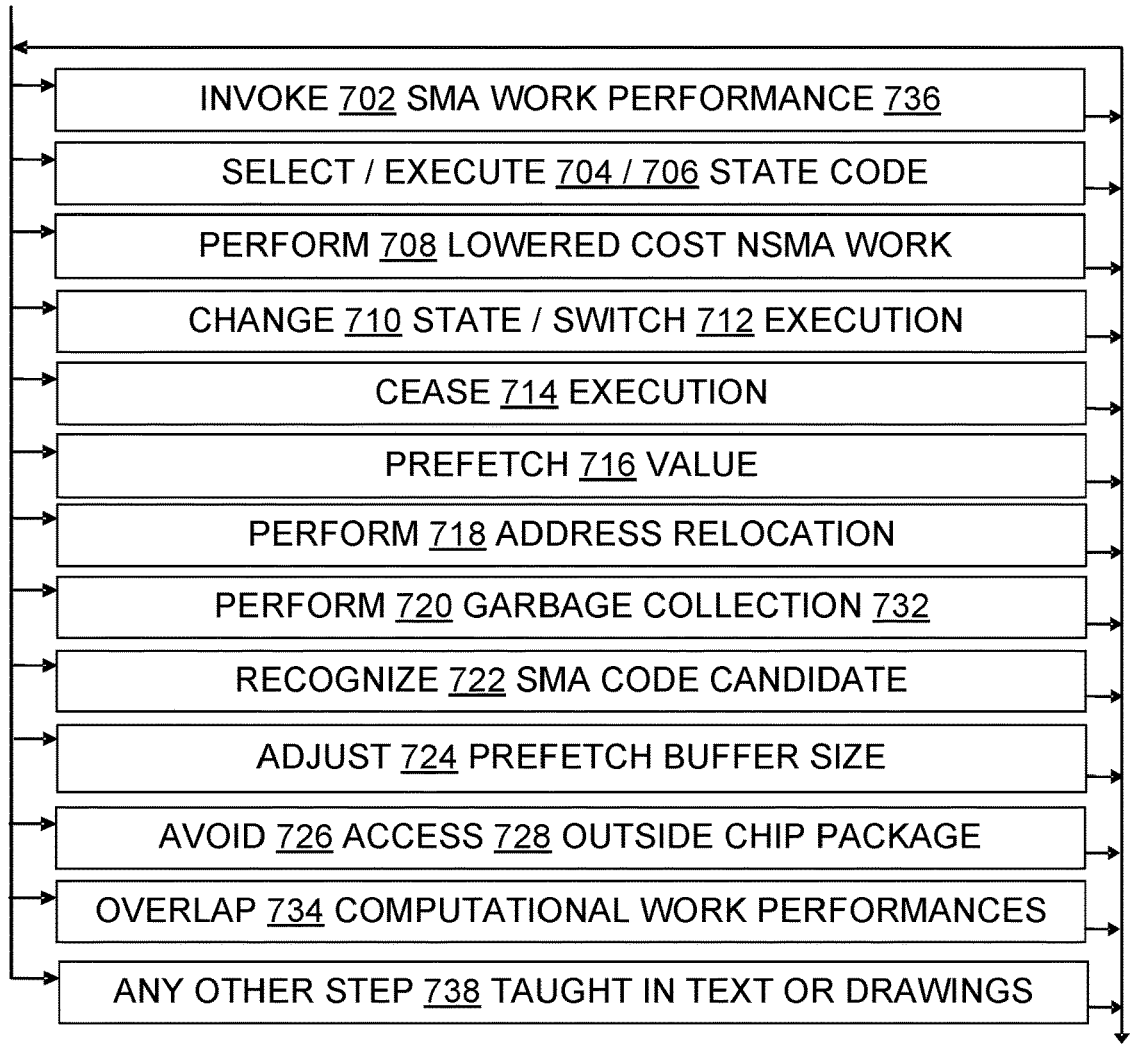
FIG. 7 is a flowchart illustrating steps in some methods for state machine-based memory access cost management.

Methods (which may also be referred to as "processes" in the legal sense of that word) are illustrated in various ways herein, both in text and in drawing figures. FIG. 7 illustrates a family of methods 700 that may be performed or assisted by an enhanced system, such as system 202 or another state machine-based memory access cost management functionality 206 enhanced system as taught herein. FIGS. 1 through 6 show memory access cost management architectures with implicit or explicit actions, e.g., steps for collecting data, transferring data, storing data, and otherwise processing data.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in source code for the system 202 to compile or interpret and execute as part of a run routine 304. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. Arrows in method or data flow figures indicate allowable flows; any arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method 700 for state machine-based memory access cost management, the method performed (executed) by a computing system, the method utilizing a state machine 204 to separate computational work that performs one or more specified memory accesses ("SMA work") from computational work that does not perform any of the specified memory accesses ("NSMA work"), the method including: invoking 702 a performance of the SMA work during an execution of the state machine; selecting 704 a state code A 408 based on a state variable of the state machine; executing 706 at least a portion of the state code A, including performing 708 a state code A portion of the NSMA work which has a lower computational cost due to the prior performance of the SMA work (e.g., computing with a prefetched value); switching 712 execution of the state machine to a state code B 408 in response to the state variable indicating a change 710 of state of the state machine; executing 706 at least a portion of the state code B, including performing a state code B portion of the NSMA work; and ceasing 714 execution of the state machine in response to the state variable indicating a termination state 502 of the state machine.

In some embodiments, the method includes overlapping 734 a performance of the SMA work with a performance of the NSMA work. Some embodiments also overlap two or more performances of SMA work. Some embodiments also overlap two or more performances of NSMA work.

In some embodiments, the method includes performing at least a portion of the NSMA work after the invoking 702 and before the ceasing 714. In other embodiments, ceasing 714 occurs immediately after an invoking 702.

In some embodiments, the SMA work includes prefetching 716 a value from a dynamic random access memory (DRAM) 610 location 612 into a processor cache 614. In some of these embodiments, the prefetching places the value into a prefetch buffer 308 having space for N entries (N being buffer size 602), with N greater than one, and the method further includes adjusting 724 N based on a measure 608 of prefetch buffer entry availability 606.

In some embodiments, the NSMA work includes performing at least a portion of an address relocation 318 during a garbage collection 732.

In some embodiments, the NSMA work is performed by a processor 110 which is located in a chip package 620, and upon execution the NSMA work does not access any dynamic random access memory 610 location 612 that is outside the chip package. That is, all instructions 116 which access memory off the package 620 have been separated in SMA work, e.g., they execute only inside a SMA routine 320.

In some embodiments, the method includes performing 736 the SMA work in response to the invoking 702. In other embodiments, the embodiment invokes an external system (external to the embodiment) to perform SMA work.

In some embodiments, performing 736 the SMA work includes executing a processor instruction 116 which has a computational cost that is not decreasable by hardware prefetch 616. Recall that such instructions may be recognized 722 as SMA work candidates 310. For example, hardware prefetch integrated into a processor can decrease memory access cost by performing specialized-hardware prefetches based on very simple patterns like "fetch the next line" or "fetch N words from here where N is constant value". More complex data retrieval patterns are not susceptible to cost reduction through hardware prefetch, but benefits of prefetching can nonetheless be obtained by separating the code for these complex memory accesses into one or more SMA routines 320 which are invoked under state machine 204 control.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a state machine 204, state machine software 302, a prefetch buffer 308, a SMA work code recognizer 222, and a SMA routine 320, in the form of data 118 and instructions 116, read from a removable storage medium 114 and/or another source such as a network connection, to form a configured storage medium. The configured storage medium 112 is capable of causing a computer system 102 to perform technical process steps for state machine-based memory access cost management, as disclosed herein. The Figures thus help illustrate configured storage media embodiments and process (a.k.a. method) embodiments, as well as system and process embodiments. In particular, any of the process steps illustrated in FIG. 7 or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a state machine-based memory access cost management method 700. This method utilizes a particular kind of state machine 204 described herein to separate computational work that performs one or more specified memory accesses ("SMA work") from computational work that does not perform any of the specified memory accesses ("NSMA work"). The method 700 includes: invoking 702 a performance of the SMA work during an execution of the state machine, prior to complete performance of the NSMA work; selecting 704 a state code A based on a state variable of the state machine; executing 706 at least a portion of the state code A, including performing 708 a state code A portion of the NSMA work which has a lower computational cost due to the performance of the SMA work; switching 712 execution of the state machine to a state code B in response to the state variable indicating a change of state of the state machine; and executing 706 at least a portion of the state code B, including performing a state code B portion of the NSMA work.

In some embodiments, the method includes performing the SMA work, and the SMA work includes prefetching 716 a value from a dynamic random access memory location into a processor cache. In some of these, prefetching places the value into a prefetch buffer having space for N entries, with N greater than one, and the method further includes adjusting 724 N based on a measure of prefetch buffer entry availability.

In some embodiments, the NSMA work includes garbage collection.

In some embodiments, the NSMA work is performed by a processor which is located in a chip package, and upon execution the NSMA work does not access any dynamic random access memory location that is outside the chip package.

Additional Observations

Additional support for the discussion of state machine-based memory access cost management functionality 206 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

In some embodiments, execution of the state machine's run routine 304 is subject to suspension or scheduling, e.g., by a process scheduler, in the same manner or a similar manner to an application program being subject to a kernel 120 process scheduler. In other embodiments, execution of the run routine depends only upon the state variable 412 and other data that are operated on by the run routine itself.

In these latter embodiments, the run routine will not be suspended partway through the code 408 of a given state. Instead, the run routine code 408 will run to its finish, and when it returns the state 306 will either be a termination state 502 or a non-termination state.

One such run routine could look something like this:

```
run( ) {
   // dereferencing memory_location cheaper due to prefetch
   a = *memory_location;
   // do some work that's not memory intensive up to a point where the code
   // either needs another expensive memory access or the code's work is done.
   if (exit condition is true)
   {
      state = DONE;
   }
   else
   {
      // change state to another state that's not DONE, or maintain current state.
      prefetch (m);
   }
}
```

FIG. 4 shows a state variable located in the run routine, but in a given implementation the state variable could also be a global located outside the run routine.

FIG. 4 shows an invocation 322 of SMA work, as opposed to SMA work itself, in order to highlight situations in which the run routine does not actually do the expensive memory access work itself but instead the run routine invokes other code to do that expensive memory access work. Examples of an invocation of SMA work in the example garbage collection code below include a call to compiler intrinsic functions, such as _mm_prefetch( ) or _prefetch2( ).

The first section of the example garbage collection code specifies a state machine with two states 306, labeled DONE and KEEP_GOING. DONE is a termination state 502.

```
enum state_machine_state { DONE, KEEP_GOING };
struct state_machine {
  uint8_t* tree;
  uint8_t** old_address_location;
  int candidate_offset;
  state_machine_state state;
  void init(uint8_t* _tree, uint8_t** _old_address_location) {
    tree = _tree;
    candidate_offset = 0;
```

```
    old_address_location = _old_address_location;
    uint8_t* old_address = *old_address_location;
    if (tree != old_address) {
      state = KEEP_GOING;
#ifdef _M_X64
      _mm_prefetch((const char*)(tree - pair_left_offset), _MM_HINT_T0);
#elif _M_ARM64
      __prefetch((const char*)(tree - pair_left_offset));
#endif
    } else {
      ptrdiff_t reloc_distance = get_reloc(tree);
      *old_address_location = old_address + reloc_distance;
      state = DONE;
    }
  }
}
```

The next section of this example garbage collection code specifies a run routine 304. This particular run routine tries to find a next node in a binary tree on; zero means processing is done. When a node is found the routine sets state as found (DONE) and returns, so next time around the routine will see the found indication and do some work with the data that was found. When a node is not found the routine keeps looking, with state set accordingly to indicate the search is not done yet.

```
void run( ){
    int cn = *(short*)(tree - pair_left_offset + ((tree < *old_address_location) * 2));
    if (!cn) {
      ptrdiff_t reloc_distance = get_reloc(tree + candidate_offset);
      *old_address_location = *old_address_location + reloc_distance;
      state = DONE;
      return;
    }
    uint8_t* candidate = tree + candidate_offset;
    tree = tree + cn;
    candidate_offset = (tree <= *old_address_location) ? 0 : (int)(candidate - tree);
    state = KEEP_GOING;
#ifdef _M_X64
    _mm_prefetch((const char*)(tree - pair_left_offset), _MM_HINT_T0);
#elif _M_ARM64
    __prefetch2((const char*)(tree - pair_left_offset), 2);
#endif
  }
}
```

The next section of this example garbage collection code specifies and utilizes a prefetch buffer 308. Prefetching 716 is an example of SMA work 212 in this embodiment.

```
// callsite; maintain an array of state machine entries
// prefetch_buf_size is the biggest size, may dynamically use the first N entries
state_machine_sm[prefetch_buf_size];
// "ref < end_ref" indicates there's still work to do.
while (ref < end_ref) {
  size_t child_obj = *ref;
  // if ref points to nonzero ask for the relocated address for it. May do other work
to filter out the addresses; don't need to ask for the relocated addresses because
they do not point into the portion of the heap being collected.
  if (child_obj) {
    // get_start_point method gets an address to start working on child_obj
    uint8_t* tree = get_start_point (child_obj);
    // To ask for the relocated address for an address, go through the state
machine to make progress and if an entry was done (i.e., available) push address
to it; otherwise ask for address without using prefetch buffer.
    // There could be different ways of going through the state machine entries.
The way illustrated here starts at #0 and go through from there.
    bool added_to_prefetch_p = false;
    int buf_idx = 0;
    while (buf_idx < prefetch_buf_size) {
```

```
    if (fr[buf_idx].state == DONE) {
        fr[buf_idx].init(tree, (uint8_t**)ref);
        added_to_prefetch_p = true;
    } else {
        fr[buf_idx].run( );
    }
    buf_idx++;
    }
    if (!added_to_prefetch_p) {
    // get_new_address_no_prefetch gets relocated address without prefetching
        *ref = get_new_address_no_prefetch(tree, (uint8_t*)child_obj);
    }
  }
  ref++;
}
```

In some embodiments, the separation of SMA work from NSMA work conforms with one or more heuristics. One heuristic for identifying code that could be separated out as memory access code is that the memory access code is isolated in the sense that other work can go on while the memory access code is running—the other code is not held up waiting for a result from the memory access code. Another heuristic is that the code has been recognized 722 as a candidate based on the kind of instructions 116 involved. However, separation may also be done by a developer who is intimately familiar with the code they want to separate, e.g., to perform prefetching, so they know whether and how other code depends on the code they want to speed up.

Some embodiments use a state machine to handle prefetching in a garbage collector 134. Dealing with memory latency in a garbage collector may be critical for performance. Using prefetch is a way to combat memory latency. A garbage collector may have a small prefetch buffer, and when work is to be done on memory in a loop, the garbage collector prefetches an address for future work and also does work on the address loaded one or more iterations ago.

Some embodiments use a state machine that will break up the work into distinct steps and during each iteration advance to the next step until the state machine says the work is done. Different stages of garbage collection may share some common work, and using a state machine allows work to easily and cleanly extend beyond the common part to include different kinds of work done for various stages. Below is an example that illustrates a relocate work that includes a common part that finds a relocated address:

```
enum state { RELOC_KEEP_SEARCHING, RELOC_FOUND,
RELOC_EXTRA_0, RELOC_EXTRA_0_END, RELOC_EXTRA_1,
RELOC_EXTRA_1_END };
struct common_reloc_state_machine {
    size_t* location_to_reloc;
    state s;
    common_reloc_state_machine(size_t* loc) {
        location_to_reloc = loc;
        s = RELOC_KEEP_SEARCHING;
    }
    void run( ) {
        if (result_found) { // location_to_reloc is relocated
            s = RELOC_FOUND;
        } else {
            // keep doing work including prefetch to find relocated address
            s = RELOC_KEEP_SEARCHING;
        }
    }
};
```

```
struct reloc_state_machine_0 : common_reloc_state_machine {
    size_t* field0;
    reloc_state_machine_0(size_t f0, size_t* loc) :
        common_reloc_state_machine(loc) {
        field0 = f0;
    }
    void run0( ) {
        if (s == RELOC_KEEP_SEARCHING) {
            run( );
        } else {
            if (s == RELOC_FOUND) {
                _mm_prefetch((const char*)field0, _MM_HINT_T0);
                s = RELOC_EXTRA_0;
            } else {
                s = RELOC_EXTRA_0_END; // update memory in field0.
            }
        }
    }
};
```

A reloc_state_machine_1 state machine could also include the common part plus its own specific work.

More generally, the separation of specified memory accesses (e.g., prefetching) and the state machine architecture make implementing prefetching or other relatively slow memory accesses much more flexible. This is helpful, for example, in a garbage collector that does a lot of memory operations which would otherwise make garbage collection often wait for data to be loaded from the main memory. An unattractive alternative to using the memory access state machine functionality 206 is to simply now wait for each memory read to finish before continuing execution. This is probably easier to implement, but does not provide the speed increase, duplication reduction, and other benefits discussed herein.

Technical Character

The technical character of embodiments described herein will be apparent to one of ordinary skill in the art, and will also be apparent in several ways to a wide range of attentive readers. Some embodiments address technical activities such as overlapping 734 specified memory accesses 210 with other computational work 216 in a computing system 202, changing 710 between states 306 during execution of a finite state machine 204 in the computing system 202, performing 718 address relocation 318 in the computing system 202, performing 720 garbage collection 732 in a computing system 202 memory 112, or adjusting 724 a prefetch buffer 308 size 602, which are each an activity deeply rooted in computing technology. Some of the technical mechanisms discussed include, e.g., state machine software 302, finite state machines 204 (which are understood to be implemented in a computing system 102, e.g., per FIG. 4, not merely on paper or mentally), prefetch buffers 308, and SMA code recognizer software 222. Some of the technical effects discussed include, e.g., (i) decreased wall clock execution time for software generally and for garbage collection 732 software in particular, (ii) decreased code review, debugging, maintenance, and upgrade burdens by virtue of shared work code 314, and (iii) more efficient use of prefetch buffer memory 308 by dynamic buffer size 602 adjustment 724. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose beneficial technical effects fully or partially solve particular technical problems, such as how to reduce computational costs imposed by memory access 210 operations, how to identify good candidate code 116 for memory access concurrency and how to implement such concurrency, how to speed up garbage collection 732, and how to use cache memory 614, 308 more efficiently. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other embodiment implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
MAC address: media access control address
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction right after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, ora hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"IoT" or "Internet of Things" means any networked collection of addressable embedded computing or data generation or actuator nodes. An individual node is referred to as an internet of things device or IoT device. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Memory access cost management operations such as invoking 702 an SMA routine 320, executing 706 state code 408 in a state machine 204 in a computing system 202, performing 708 computational work 216, whose cost 218 was lowered by prefetching 716 a value 622, and many other operations discussed herein, are understood to be inherently digital. A human mind cannot interface directly with a CPU or other processor 110, or with RAM or other digital storage 112, to read and write the necessary data to perform the memory 112 access 210 cost 218 management steps 700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, adjusting, caching, ceasing, changing, executing, invoking, measuring, overlapping, performing, prefetching, recognizing, selecting, separating, switching (and accesses, accessed, adjusts, adjusted, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"

104 users, e.g., user of an enhanced system 202, such as a developer or programmer; refers to a human or a human's online identity unless otherwise stated 106 peripheral device 108 network generally, including, e.g., LANs, WANs, software-defined networks, clouds, and other wired or wireless networks 110 processor; includes hardware 112 computer-readable storage medium, e.g., RAM, hard disks 114 removable configured computer-readable storage medium 116 instructions executable with processor; may be on removable storage media or in other memory (volatile or nonvolatile or both)

118 digital data in a system 102

120 kernel(s), e.g., operating system(s), BIOS, UEFI, device drivers 122 applications or other software tools, e.g., version control systems, cybersecurity tools, software development tools, office productivity tools, social media tools, diagnostics, browsers, games, email and other communication tools, commands, and so on 124 user interface; hardware and software 126 display screens, also referred to as "displays"

128 computing hardware not otherwise associated with a reference number 106, 108, 110, 112, 114

130 cache memory generally; an example of memory 112

132 digital value in cache, e.g., in prefetch buffer or processor cache 134 garbage collector, i.e., software which upon execution performs garbage collection 732

136 cloud, cloud computing environment 202 system 102 enhanced with specified memory access state machine functionality 206

204 state machine as implemented in a system 202; also referred to as a finite state machine; computational 206 specified memory access state machine functionality, also referred to as "memory access state machine functionality" or "state machine-based memory access cost management functionality"; e.g., software or specialized hardware which performs memory access cost management using a state machine to overlap specified memory accesses with other computational work, or software or specialized hardware which configured to perform at least steps 702-712 (although not necessarily in numeric order), or any software or hardware which performs or is configured to perform a method 700 or a memory access cost management activity first disclosed herein 208 activity of separating specific memory access code from other code, or a result of such activity as implemented in software in a system 202; for convenience, separating 208 a code X from a code Y may also be referred to as separating 208 computational work done by code X upon execution of code X from computational work done by code Y upon execution of code Y, where code X and code Y differ in at least one instruction 116

210 specified memory access (SMA); a computational activity of accessing memory 112 in which the access is performed by execution of SMA code 220; may also refer to a result of such computational activity in a system 202, or in some contexts to memory access generally when "specified" or "SMA" is not indicated 212 SMA work; computational work performed by execution of a specified memory access instruction 116 or instruction sequence 116 in SMA work code 220

214 NSMA; computation other than specified memory access 210; NSMA may include memory access done by code that has not been placed in a SMA routine 320, for instance, or computation that does not access memory other than processor registers, or both; also referred to as non-SMA 216 NSMA work; computational work other than SMA work 212; also referred to as non-SMA work 218 computational cost of a code, e.g., elapsed time (wall clock time or processor cycles or both) during execution of the code, electric power consumed by execution of the code, or heat generated by execution of the code 220 specified memory access code, also referred to as SMA code or SMA work code; an instruction 116 or instruction sequence 116 which upon execution performs a computational activity of accessing 210 memory 112, in which the instruction(s) 116 performing the access 210, or the accessed 210 memory, or both, are specified by virtue of placement of the instruction(s) in a SMA routine 320 that is reachable for execution through an invocation 322 in a state machine state code 408

222 SMA code recognizer, i.e., software which upon execution recognizes a SMA code candidate 310; may utilize parsing, lexical analysis, decompilation, regular expression or other pattern matching, for example 302 state machine software, e.g., software which upon execution performs at least steps 702-712 (not necessarily in numeric order)

304 run routine; software 306 state of a state machine as represented in a system 202, e.g., by an instruction pointer 406, a state variable 412, or both 308 prefetch buffer; a cache 130 used to hold prefetched values 622

310 SMA code candidate; e.g., source code or other software which has at least one of the following characteristics: includes memory access operations which can be overlapped 734 with other computational work, is recognized by a recognizer 222, or is similar to code of an SMA routine body at the level of memory access instructions 116 under a metric such as having a defined threshold amount of the same opcodes or accessing a defined threshold amount of the same sector or block of memory 312 shared computational work, as represented in a system 202 or its activities; a.k.a. "shared work"

314 shared work code, i.e., software which performs shared work 312 upon execution in a system 202

316 memory address in a system 202; also referred to simply as an "address"

318 address relocation; computational activity of moving a data structure to a different memory address and updating pointers accordingly, or a result of such computational activity in a system 202

320 SMA routine, i.e., software routine which performs SMA work 212 on execution of SMA code 220

322 SMA routine invocation, e.g., computational activity in the form of a call or other instruction pointer jump to a SMA routine, or a result of such computational activity in a system 202

324 interface generally in a system 102; computational, may include hardware 402 state data structure in a state machine, as implemented in a system 202; digital 404 state ID, e.g., a string such as "DONE", "A", etc., ora number; the state ID distinguishes the identified state 306 from other states 306; state 306 identification may be explicit in an ID 404 or state 306 identification may be implicit, e.g., in the starting address of the state's code 408; digital 406 instruction pointer, e.g., an address of the next instruction 116 to execute or an address of the most recently executed instruction 116; may be on a per-state basis or a per-state-machine basis or a per-program basis, for example (FIG. 4 shows per-state instruction pointer as an optional implementation)

408 state code, i.e., code that is associated with a state S and which is to be executed when the state machine is in state S, digital 410 instruction(s) 116 which upon execution perform NSMA work 216

412 state variable as implemented in a state machine 204 in a system 202; may hold an identification of the most recently executed state 396, the current state 306, or the next state 306 to execute, depending on the particular implementation; changes in the value of the state variable 412 correspond to changes 710 in state 306

502 termination state 306 of a state machine 204, as implemented in a system 202

504 transition in a state machine 204, as implemented in a system 202; may be a transition from one state to another, e.g., from state A to state C in FIG. 5, or be a transition from one state to itself, e.g., state D to state D in FIG. 5

602 size of a prefetch buffer, in terms of buffer entries; digital 604 prefetch buffer entry; may refer to the space in the prefetch buffer or to the data in that space; digital 606 prefetch buffer availability, i.e., a characteristic indicating an extent to which a prefetch buffer has space available to receive value(s) in entry(ies) without overwriting buffer content that was prefetched for use but has not yet been completely used; represented digitally in a system 202

608 measure of prefetch buffer availability, as represented digitally in a system 202; may refer to a computational activity of measuring prefetch buffer availability or to a result of such computational activity 610 dynamic random access memory, a.k.a. DRAM, as opposed to processor registers (DRAM technology and processor register technology may be similar in a given system, but in terms of the present embodiments accessing processor registers is differentiated from accessing other storage locations)
612 storage location in memory 112; presumed to not be a processor register unless stated otherwise
614 processor cache; storage located outside processor registers but on the same chip or chip package as the processor, e.g., L1 cache or L2 cache
616 hardware prefetch; refers to specialized hardware which performs data prefetch, or to a result of operation of such specialized hardware
618 processor 110 chip
620 processor 110 chip package
622 digital value generally in a system 102
624 processor 110 register
700 flowchart; 700 also refers to state machine based memory access cost management methods that are illustrated by or consistent with the FIG. 7 flowchart
702 computationally invoke SMA work performance, e.g., by calling a SMA routine 320
704 computationally select a state code, e.g., by setting an instruction pointer to an instruction in a state code
706 computationally execute a state code or portion thereof
708 computationally perform NSMA code whose cost 218 was decreased by prior SMA code execution
710 computationally change state 306, e.g., by changing the state variable 412 or by setting an instruction pointer to an instruction in a different state code than the current state's state code
712 computationally switch execution of a run routine 304 to a different state code than the current state's state code
714 computationally cease execution, e.g., return system control from a state machine to a kernel or application that launched the state machine
716 computationally prefetch a value into a prefetch buffer for possible (or even expected) later use in a computation that would otherwise have done a memory access that was instead done by a prefetch SMA routine 320
718 computationally perform address relocation 318
720 computationally perform garbage collection 732
722 computationally recognize a SMA code candidate 310, e.g., by execution of a recognizer 222
724 computationally adjust a prefetch buffer size 602
726 computationally avoid memory access 728 during the duration of a block of code or a particular routine execution or a particular state code execution; other memory access is permitted
728 by execution of a processor, access memory located outside a chip package that contains the processor
732 garbage collection; computational activity
734 computationally overlap executions of two or more respective codes; may also be referred to as running (or executing) the codes concurrently or in parallel
736 computationally perform SMA work, or an instance of computational performance of SMA work
738 any step discussed in the present disclosure that has not been assigned some other reference numeral; 738 may thus be shown expressly as a reference numeral for various steps, and may be added as a reference numeral for various steps without thereby adding new matter to the present disclosure

CONCLUSION

In short, the teachings herein provide a variety of state machine-based memory access cost management functionalities 206 which operate in enhanced systems 202. Computational costs 218 are reduced for garbage collection 732 or other computational work that accesses 210 memory 112 which is located outside processor registers 624. Cost 218 reduction is accomplished by specifying at least some of the memory 112 accesses and separating 208 them from other computations, and by utilizing a memory access cost management state machine 204 to control the execution of both kinds of computation. Code that employs memory access results 622 is placed in a run routine 304 which is divided between respective states 306 of the state machine. The specified memory accesses are invoked 702 from a state code 408, and they overlap 734 other computation to reduce overall execution time 218. A prefetch buffer 308 may be dynamically sized 724 based on the availability 608 of space 604 in the prefetch buffer. Code 314 for shared work, such as address relocation 318 code, may be placed in its own state structure 402. Candidate code 310 for possible separation 208 into a specified memory access routine 320 may be automatically recognized 722.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed.

Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured to separate computational work that performs one or more specified memory accesses ("SMA work") from computational work that does not perform any of the specified memory accesses ("NSMA work"), the computing system comprising:
   a digital memory; and
   a processor in operable communication with the digital memory;
   the computing system configured by a run routine including processor instructions which upon execution by the processor perform NSMA work, the run routine also including an invocation of the SMA work;
   the computing system also configured by a state machine which includes a state variable and at least three state structures, each state structure representing a respective state of the state machine and including a respective state code, each state code including a portion of the run routine, wherein at least three state structures respectively represent states designated here as state A, state B, and state C, and wherein state C has shared work code in that state A code is configured to change the state machine to state C and state B code is also configured to change the state machine to state C;

wherein the run routine is configured to cause execution of a selected state code based on the state variable, configured to cease execution when the state variable indicates a termination state of the state machine, and configured to switch execution to a different state code when the state variable indicates a change of state of the state machine.

2. The computing system of claim 1, wherein the invocation of the SMA work invokes a specified memory access routine which is configured to upon execution prefetch a value into a cache.

3. The computing system of claim 1, wherein the run routine is configured to upon execution perform an address relocation during a garbage collection.

4. The computing system of claim 1, further comprising a SMA work code recognizer which is configured to upon execution recognize, as a SMA work code candidate, at least one of:
   a processor instruction that upon execution may access memory located outside a cache, depending on a status of the cache during execution of a program; or
   a processor instruction having a computational cost that is not decreased by hardware prefetch.

5. The computing system of claim 1, further comprising a SMA work code recognizer which is configured to upon execution recognize, as a SMA work code candidate,
   a processor instruction that upon execution will access memory located outside a cache.

6. The computing system of claim 1, wherein the computing system further comprises a prefetch buffer, the SMA work includes prefetching values into the prefetch buffer, and the prefetch buffer has a size which the computing system is configured to adjust based on a measure of prefetch buffer entry availability.

7. A method utilizing a state machine to separate computational work that performs one or more specified memory accesses ("SMA work") from computational work that does not perform any of the specified memory accesses ("NSMA work"), the method comprising:
   invoking a performance of the SMA work during an execution of the state machine;
   selecting a state code A based on a state variable of the state machine;
   executing at least a portion of the state code A, including performing a state code A portion of the NSMA work which has a lower computational cost due to the performance of the SMA work;
   switching execution of the state machine to a state code B in response to the state variable indicating a change of state of the state machine;
   executing at least a portion of the state code B, including performing a state code B portion of the NSMA work; and
   ceasing execution of the state machine in response to the state variable indicating a termination state of the state machine.

8. The method of claim 7, wherein the method comprises overlapping a performance of the SMA work with a performance of the NSMA work.

9. The method of claim 7, wherein the method comprises performing at least a portion of the NSMA work after the invoking and before the ceasing.

10. The method of claim 7, wherein the SMA work comprises prefetching a value from a dynamic random access memory location into a processor cache.

11. The method of claim 10, wherein the prefetching places the value into a prefetch buffer having space for N entries, with N greater than one, and the method further comprises adjusting N based on a measure of prefetch buffer entry availability.

12. The method of claim 7, wherein the NSMA work comprises performing at least a portion of an address relocation during a garbage collection.

13. The method of claim 7, wherein the NSMA work is performed by a processor which is located in a chip package, and wherein upon execution the NSMA work does not access any dynamic random access memory location that is outside the chip package.

14. The method of claim 7, comprising performing the SMA work in response to the invoking.

15. The method of claim 14, wherein performing the SMA work includes executing a processor instruction which has a computational cost that is not decreasable by hardware prefetch.

16. A computer-readable storage device configured with data and instructions which upon execution by a processor cause a computing system to perform a method utilizing a state machine to separate computational work that performs one or more specified memory accesses ("SMA work") from computational work that does not perform any of the specified memory accesses ("NSMA work"), the method comprising:
   invoking a performance of the SMA work during an execution of the state machine, prior to complete performance of the NSMA work;
   selecting a state code A based on a state variable of the state machine;
   executing at least a portion of the state code A, including performing a state code A portion of the NSMA work which has a lower computational cost due to the performance of the SMA work;
   switching execution of the state machine to a state code B in response to the state variable indicating a change of state of the state machine; and
   executing at least a portion of the state code B, including performing a state code B portion of the NSMA work.

17. The computer-readable storage device of claim 16, wherein the method comprises performing the SMA work, and the SMA work comprises prefetching a value from a dynamic random access memory location into a processor cache.

18. The computer-readable storage device of claim 17, wherein the prefetching places the value into a prefetch buffer having space for N entries, with N greater than one, and the method further comprises adjusting N based on a measure of prefetch buffer entry availability.

19. The computer-readable storage device of claim 16, wherein the NSMA work comprises a garbage collection.

20. The computer-readable storage device of claim 16, wherein the NSMA work is performed by a processor which is located in a chip package, and wherein upon execution the NSMA work does not access any dynamic random access memory location that is outside the chip package.

* * * * *